Patented Jan. 17, 1928.

1,656,190

UNITED STATES PATENT OFFICE.

LOWELL O. GILL, OF DECATUR, ILLINOIS, ASSIGNOR TO A. E. STALEY MANUFACTURING COMPANY, OF DECATUR, ILLINOIS, A CORPORATION OF DELAWARE.

LAUNDRY STARCH AND METHOD OF MANUFACTURING SAME.

No Drawing.  Application filed April 25, 1923. Serial No. 634,636.

This invention relates to the manufacture of starch for laundry purposes and has for one of its objects the production of a thin boiling starch which will remain fluid after boiling and cooling to normal temperature.

Another object is to provide an improved method of manufacturing laundry starch.

Other objects will appear hereinafter.

The invention is exemplified in the starch composition and the steps of the process described in the following specification, and it is more specifically pointed out in the appended claims.

In modern laundry practice it is desirable to use on such work as collars, cuffs, and other articles of clothing a starch that will when boiled to a paste with water have the property of penetration even after the starch has cooled and which will impart flexibility to the starched article and which will resist perspiration, give the proper finish, and have other desirable qualities for laundry starch.

To secure these properties the starch should not congeal after it has been boiled in amounts ranging from 10 to 12 ounces per gallon of water and allowed to cool to normal temperature. Ordinary corn starch congeals after it has been boiled, but the present invention produces from corn starch a laundry starch which has the desired properties named above.

In carrying out the present invention two starches are first prepared by the usual method of producing what is known in the trade as thin boiling starch. In the treatment of corn starch to produce thin boiling starch the corn starch is mixed with water at approximately 125° C. to which is added a small amount of sulphuric acid and the mixture is agitated for various lengths of time, depending on the degree of fluidity or viscosity that is desired in the finished starch when it is boiled with water. After the starch has been treated in this way for the required length of time the mixture is neutralized with soda ash and the usual process is to then filter and dry the starch. To this point the present method follows the well-known procedure of producing thin boiling starch.

In the process of producing starch according to the present invention, two thin boiling starches are first produced by the usual method just outlined above. One of these starches is sufficiently modified to produce a starch of medium fluidity while the other starch employed has a relatively high fluidity. In practice, satisfactory results can be secured by employing starches having a fluidity of 40 and 90 respectively when tested according to the method by which the fluidity of the starch is compared with that of water. In making the fluidity test, advantage is taken of the fact that starch treated with a moderately strong alkali solution of sodium hydrate thickens and has somewhat the consistency of starch paste. The sodium hydrate solution breaks up the starch cells in a manner similar to that produced by boiling with water. The extent to which a starch has been modified to render it thin boiling is determined by treating a known amount of starch with a given amount of 1% of sodium hydrate free from carbonate of soda and comparing its fluidity or viscosity with that of water at a stated temperature, 75° F. being the temperature commonly used. The fluidity is determined after treatment by knowing how much will pass through a small aperture in a given time as compared with the amount of water that will pass through the same aperture in the same time.

In conducting the test about 10 grams of the starch to be tested is dried at a temperature of 200° F. spread out in a thin layer on a piece of filter paper and dried for two hours. 4.5 grams of starch thus dried is added to 10 cc. distilled water and thoroughly mixed after which 90 cc. of 1% sodium hydrate solution at 75° F. is added and stirred gently for three minutes, keeping the temperature at 75° F. The starch solution is then placed in a funnel having a capillary tube outlet and means for controlling the opening of the tube. The tube is previously calibrated to determine the length of time required for 100 cc. of water to run out at 75° F. The number of cc. of the starch solution that will pass through the tube in the same period of time gives the fluidity of the solution. For instance, if 100 cc. of water at 75° F. passes through the tube in fifty-five seconds and if 40 cc. of the starch solution passes through the tube in the same time then the starch is said to have a fluidity of 40.

In preparing a starch according to the present invention, equal quantities of starch having fluidities of 40 and 90 respectively as tested by the method outlined above are mixed together after neutralizing the acidity and before they are filter pressed. After they have been thoroughly mixed in the wet state the blended starch is washed through silk bolting cloth and filter pressed. The filtered starch is again mixed with fresh water until it has a gravity of 22 to 23° on a Baumé hydrometer scale. It will be understood, of course, that the exact fluidity of the two blended starches may be varied somewhat and the relative proportions may be changed, but the proportions and fluidity mentioned have been found to give satisfactory results in practice.

To this mixture is added a white corn dextrine to the amount of 5% of the weight of the dry starch in the mixture. This amount may be varied slightly and any good dextrinized starch may be used in place of the corn dextrine. After adding the dextrine to the mixture a wax preparation is added to the amount of 3% of the weight of the dry starch in the mixture. This wax preparation is made by mixing 23 parts of Japan wax and 10 parts of stearic acid, the two being melted together and emulsified by slowly adding while stirring a solution of 8 parts of borax in 59 parts of water. The wax mixture is then heated to 160° F. to thoroughly emulsify the mixture, after which it is cooled to normal temperature. It is then added to the starch and dextrine mixture. It is not necessary to add the dextrine and wax preparation in the exact manner outlined as any suitable method of mixing may be employed, such as mixing the wax and dextrine together and adding the two ingredients to the starch after they have been intermixed, or, the wax and dextrine may be mixed together and added to the blended starch after the starch is dried. After the ingredients have been thoroughly mixed the conglomerate is filtered and dried. The drying may be either a quick or slow drying process producing a granular form in the first case or a crystal form in the latter case.

I claim:

1. A laundry starch comprising a mixture of two starches which have been modified to produce different degrees of fluidity but neither of which has been entirely converted.

2. A laundry starch comprising a mixture of two starches, one of which has been modified to have a fluidity of approximately 40, and the other of which has been modified to have a fluidity of approximately 90, regarding the fluidity of water as 100.

3. A laundry starch comprising a mixture of approximately equal parts of corn starch, one part having been modified to a fluidity of approximately 40, and the other to a fluidity of approximately 90, as compared to the fluidity of water regarded as 100.

4. A laundry starch comprising a mixture of starches modified to vary the degrees of fluidity but neither of which has been completely converted, to which mixture dextrine is added.

5. A laundry starch comprising approximately equal parts of corn starches modified to have fluidities of approximately 40 and 90 respectively, to which mixture is added dextrine to the amount of approximately 5% of the weight of the dry starch.

6. A laundry starch to which is added a wax preparation, comprising Japan wax and stearic acid and borax.

7. A laundry starch comprising two parts of modified corn starch, one part being modified to a viscosity of approximately 40, and the other part being modified to a viscosity of approximately 90, there being added to the mixture dextrine and a wax preparation, the wax preparation comprising Japan wax, stearic acid and borax.

8. A laundry starch comprising substantially equal parts of modified corn starch, one part being modified to a viscosity of approximately 40, and the other part being modified to a viscosity of approximately 90, there being added to the mixture dextrine to the amount of approximately 5% of the weight of the dry starch in the mixture and a wax preparation amounting to approximately 3% of the weight of the dry starch, the wax preparation comprising approximately 23 parts Japan wax, 10 parts stearic acid melted together and emulsified in a solution of approximately 8 parts of borax to 59 parts water.

9. The method of preparing laundry starch comprising the steps of separately modifying two parts of corn starch with sulphuric acid, one part being modified to a fluidity of approximately 40, and the other to a fluidity of approximately 90, and mixing substantially equal portions of the two parts after the acidity has been neutralized.

10. The process of preparing laundry starch, comprising the steps of modifying two parts of starch with sulphuric acid, neutralizing the acid with soda ash after one of the parts has been modified to increase its fluidity, and the other has been modified to produce relatively higher fluidity, mixing substantially equal parts of the modified starches, and adding to the mixture dextrine and a wax preparation.

11. The method of preparing laundry starch, comprising the blending of two modified starches having different degrees of fluidity, and adding to the mixture dextrine and a preparation of Japan wax, stearic acid and borax.

12. The method of producing laundry starch comprising the steps of mixing equal parts of modified corn starch, one part having a fluidity of approximately 40, and the other a fluidity of approximately 90, adding to the mixture dextrine to the amount of approximately 5% of the dry starch and a wax preparation to the amount of approximately 3% of the dry starch, the wax preparation comprising Japan wax, emulsified with stearic acid and borax.

13. The method of preparing laundry starch wherein two portions of corn starch are modified with sulphuric acid and neutralized with soda ash to produce a fluidity of approximately 40 in one portion, and approximately 90 in the other portion, equal parts of the modified starches being mixed together, washed and filter pressed, the filtered starch being mixed with water to give a gravity of approximately 22 to 23° on a Baumé hydrometer scale, to which mixture is added dextrine approximately to the amount of 5% of the weight of the dry starch and a wax preparation to the amount of approximately 3% of the weight of the dry starch, the wax preparation comprising emulsified Japan wax with stearic acid and borax, the entire conglomerate being filtered from the water and dried.

In testimony whereof I have signed my name to this specification on this 21st day of April, A. D. 1923.

LOWELL O. GILL.